US006071620A

United States Patent [19]

Kuczynski et al.

[11] Patent Number: 6,071,620

[45] Date of Patent: Jun. 6, 2000

[54] LITHOGRAPHIC LAYER FOR A PRINTING BLANKET AND THE PRINTING OFFSET BLANKET INCORPORATING SAME

[75] Inventors: Jerzy Kuczynski, Zillisheim; Sophie Haraux, Thann, both of France

[73] Assignee: Rollin S.A., France

[21] Appl. No.: 08/910,745

[22] Filed: Aug. 13, 1997

[30] Foreign Application Priority Data

Aug. 14, 1996 [FR] France .................................. 96 10218

[51] Int. Cl.[7] ...................................................... B32B 27/40

[52] U.S. Cl. .................................... 428/425.1; 101/415.1; 428/509; 428/511; 428/512; 428/513; 428/514

[58] Field of Search ................................ 428/425.1, 509, 428/511, 512, 513, 514; 101/415.1

[56] References Cited

U.S. PATENT DOCUMENTS

| | | | |
|---|---|---|---|
| 3,387,074 | 6/1968 | Hill | 264/259 |
| 3,819,471 | 6/1974 | Sohnemann | 161/162 |
| 4,350,735 | 9/1982 | Saitoh | 428/328 |

FOREIGN PATENT DOCUMENTS

| | | |
|---|---|---|
| 2 152 195 | 4/1973 | France . |
| 2 287 337 | 5/1976 | France . |
| 2 013 563 | 3/1971 | Germany . |
| 3 043 485 | 5/1981 | Germany . |
| 63-005997 | 1/1988 | Japan . |

OTHER PUBLICATIONS

Derwent WPI Acc. No. 71–22099S/197113, English–language abstract of Germany 2 013 563.

Derwent WPI Acc. No. 76–30498X/197617, English–language abstract of Germany 2 544 433.

Patent Abstracts of Japan, vol. 012, No. 201 (M–707), Jun. 10, 1988 & JP 63 005997 A (Toray Ind Inc), Jan. 11, 1988.

*Primary Examiner*—D. S. Nakarani
*Attorney, Agent, or Firm*—Woodcock Washburn Kurtz Mackiewicz & Norris

[57] ABSTRACT

A lithographic layer for a printing blanket and the printing offset blanket incorporating same, wherein the lithographic layer is made from a thermoplastic material with a polar character providing a maximum transfer of printing ink from the blanket to the paper and is easily washable thereby resulting in a minimum ink consumption.

21 Claims, No Drawings

LITHOGRAPHIC LAYER FOR A PRINTING BLANKET AND THE PRINTING OFFSET BLANKET INCORPORATING SAME

TECHNICAL FIELD

The subject of this invention is essentially a lithographic layer for a blanket printing cylinder of any structure.

It also covers a blanket cylinder fitted with this layer.

BACKGROUND OF THE INVENTION

In general, it is known that offset printing processes employ a cylinder which is covered with an offset plate receiving water and ink to form a latent image which is then transferred onto a blanket cylinder consisting of an outside lithographic layer capable of transferring the image onto a paper medium for example.

The transfers of water and ink from the offset plate to the lithographic layer, and then from the lithographic layer onto the paper are governed by a certain number of affinity parameters, to the water and the ink, of the offset plate, the lithographic layer of the blanket cylinder, and of the paper.

These parameters can be summarised in terms of a surface energy which can be broken down into a dispersive component and polar components.

In this respect, reference can be made to the following publication: R. J. Good, J. Adhésion Sci. Technol, Vol. 6, No. 12, 1269 (1992).

In short, the surface energies of a polar character, expressed in millijoules per square meter, and which are used to characterise the ability to transfer the ink and the water, are the following three components:

the polar component to water, which is used to describe the wetting potential by water and the wetting potential by the ink-water emulsion, the polar component to formamide, which is used to express the basic character of the surface, and therefore its affinity with the acid wetting solutions, and the polar component to dimethyl sulphoxide (DMSO), which is used to describe the acid value of the surface, and thus its affinity with inks which have a light basic polar composition.

In addition, the surface energy of a dispersive character is specified in terms of its dispersive component.

This being the case, if good ink transfer to the paper is required, then a good compromise must be found for the values of the above components, in order once again to ensure good transfer of the ink-water emulsion from the offset plate onto the lithographic layer of the blanket cylinder, and from the blanket cylinder to the paper.

Most of the known lithographic layers for blanket printing cylinders are made from nitrile rubber.

Such a layer constitutes a non-polar or weakly polar surface, so that it is slightly wetted by the water which is polar, and so that the ink tends to accumulate on the said surface. Thus the surface of the blanket cylinder gets dirty easily. Moreover, transfer of the ink to the paper is far from ideal, with the result that printing on paper can be unsatisfactory.

Now as one understands it, if the dispersive component of the lithographic layer is low, very little ink from the offset plate will be taken up by the said layer, and the printing process will be faulty.

On the other hand, if the dispersive component of the lithographic layer is high, then a large quantity of ink will be taken up by the blanket cylinder, but then its release onto the paper will be difficult, and the blanket cylinder will become dirty.

It will therefore be necessary to wash the blanket cylinder frequently, or even to replace it, not to mention that printing with such a blanket cylinder with a nitrile rubber lithographic layer will use a great deal of ink.

SUMMARY OF THE INVENTION

The purpose of this invention is to remedy all of these problems and disadvantages by proposing a lithographic layer with significant polar components, so that virtually all of the ink taken up by the lithographic layer of the blanket cylinder will be transferred to the paper.

To this end, the subject of this invention is a lithographic layer for a blanket printing cylinder, characterised by the fact that the said layer is a layer of thermoplastic material which ensures maximum transfer of the printing ink from the blanket cylinder to the paper.

According to another characteristic of the invention, the aforesaid thermoplastic material is based upon polyurethane or an ethylene-propylene copolymer.

According to one production example, the thermoplastic material is polyurethane, including at least mineral and/or organic loading materials such as, for example, magnesium silicate, alumino-silicates, or metal oxides, used separately or in a mixture, and plastifiers such as the ester or polymeric type for example.

According to a further characteristic, the lithographic layer of the invention is characterised by the fact that the thermoplastic material includes an ethylene vinyl acetate (EVA) copolymer.

According to yet another characteristic, the lithographic layer of the invention is made up from polyurethane which includes about 0 to 30 parts by weight of loading, and about 0 to 10 parts by weight of plastifier for every 100 parts by weight of polyurethane.

According to this invention, the lithographic layer is also characterised by the fact that the EVA copolymer represents about 0 to 20 parts by weight for every 100 parts weight of polyurethane.

In accordance with a preferred method of production, the lithographic layer includes 0 to 20 parts weight of EVA copolymer, 0 to 30 parts weight of mineral loading and 0 to 10 parts weight of plastifier, for every 100 parts weight of polyurethane.

The lithographic layer of the invention can also have at least one pigment which can constitute about 2 parts by weight for every 100 parts by weight of polyurethane.

According to still another characteristic, the lithographic layer of the invention is characterised by the fact that its surface has a polar character, and possesses a polar component to water of between 0 and 20 mJ/m2, a polar component to formamide of between about 0 and 20 mJ/m2, and a polar component to dimethyl sulphoxide which is more or less the same as the polar component to formamide.

In a preferred manner, the polar component to water is between 5 and 15 mJ/m2, and the polar component to formamide is between 0 and 10 mJ/m2.

However, other characteristics and advantages of the invention will be described better in the following detailed description of the lithographic layer for a blanket printing cylinder, in accordance with the principle of the invention.

DETAILED DESCRIPTION OF THE INVENTION

A lithographic layer of a polar character, in accordance with the invention, possessing excellent printing and washing capabilities, is made up, according to a production example, from thermoplastic polyurethane which is given a polar quality by the incorporation of the following elements or ingredients - ethylene vinyl acetate (EVA) copolymer, mineral loading, plastifier, and possibly pigment(s).

Since polyurethane presents very good chemical resistance, it is possible to use that which is known by the commercial name of Laripur 7025, Uceflex PS 4075, Resamine P1078, or Estane 58206.

The ethylene vinyl acetate copolymer can, for example, be a copolymer of the type known under the commercial name of Lavapren, which has the advantage not only of having a polar character but also plays the role of a polymer plastifier. It is also possible, without moving out of the framework of the invention, to use, in place of the ethylene vinyl acetate (EVA) copolymer, various plastomers known in this area, and conferring suitable surface properties to the lithographic layer, such as, for example, a chlorosulphonated polyethylene, a carboxilated nitrile, a hydrogenated nitrile, polyetheramides of a type known by the commercial name of Pebax, polyamide powder of the type known by the commercial name of Orgasol, and other similar products.

As mineral loadings, it is possible to use magnesium silicate of a type known by the name of "Mistron Vapor", and alumino-silicate of the Sillitin type, and metal oxides.

As explained above, the plastifier is obtained by the special characteristics of Levapren EVA, though other plastifiers can be used without moving outside the framework of the invention. The role of the plastifier is essentially to adjust the elastic modulus of the lithographic layer in order to enable it to conform mechanically to the irregularities of the paper, and to give it the flexibility required for the printing process.

The pigment(s) incorporated into the thermoplastic polyurethane can be mineral pigment or of an appropriate organic type.

In accordance with a preferred production example, the make-up of the lithographic layer, as specified in this invention, includes all of the above elements with the indicated proportions by weight:

Thermoplastic polyurethane: 100 parts by weight

EVA copolymer: 0 to 20 parts by weight

Mineral loading: 0 to 30 parts by weight

Plastifier: 0 to 10 parts by weight

Pigment: 0 to 2 parts by weight

With certain specified values within the proportions indicated above, the surface of the lithographic layer, in accordance with this invention, presents an advantageously polar character. More accurately, it has a polar component to water of between 0 and 20 mJ/m2, a polar component to formamide of between 0 and 20 mJ/m2, and a polar component to dimethyl sulphoxide which is about equal to the polar component to formamide.

It will be seen that the polar component to water should preferably be between 5 and 15 mJ/m2, and the polar component to formamide should preferably be between 0 and 10 mJ/m2.

In order to demonstrate the advantages offered by the polar lithographic layer, in accordance with the invention, comparative tests were performed with two lithographic layers of a type known in the trade, namely an A layer based on acrylonitrile, forming part of the blanket cylinder as described in document U.S. Pat. No. 4,303,721,and marketed by the applicant party under the label of Polycell, and a B layer which conforms to the composition described in example 3 of document U.S. Pat. No. 5,294,481.

The proportions by weight of the elements making up the lithographic layer of the invention used in the tests are as follows:

Thermoplastic polyurethane—Resamine P-1078: 100 parts by weight

EVA copolymer—Levapren 700HV: 10 parts by weight

Mineral loading: 20 parts by weight plastifiers: 2 parts by weight

Pigment: 1 part by weight

In table 1 below, giving the surface energies calculated from drop angle measurements taken from the Krüss G10 equipment, it can be seen that the comparative tests with layer A and layer B consisted of measuring the polar component to water (a), the polar component to formamide (b), and the polar component to dimethyl sulphoxide (c).

TABLE 1

| | The polyurethane of the invention | Layer A | Layer B |
|---|---|---|---|
| a | 8.3 | 0.1 | 0.1 |
| b | 6.7 | 0.1 | 2.3 |
| c | 5.3 | 4.8 | 0.1 |

It can be seen at once from this table that the values a, b and c are clearly higher for the polyurethane of the invention than for the earlier lithographic layers, A and B.

This the polar character of the lithographic layer of the invention is much more noticeable in relation to the lithographic layers of the earlier type, and therefore results in a much better washing characteristic and better transfer of the ink to the paper.

This is because the polarity of the surface facilitated the water-ink balance, which is vital for the offset printing process, and also because the polarity of the surface makes adhesion of the ink to the blanket cylinder more easily reversible, thereby, as we have seen, facilitating the transfer of ink and the washing process.

Furthermore, tests were conducted on the transfer of ink, and were used to measure the quantity X (g/m2) of ink necessary to transfer Y (g/m2) of ink to the paper.

These tests were carried out as follows:

They were carried out using a laboratory press of the IGT A2 type, an inking device of the IGT AE type, and a precision balance with an accuracy of $10^{-4}$ g.

The lithographic layer was affixed to the disk of the IGT press using a double-sided adhesive fabric tape. The printer layer and the printing medium had to be of regular thickness (to within 0.05 mm) and the total thickness had to be less than 2.5 mm. The surface of the sample, Sb, had to be determined (sample dimensions of the blanket cylinder −20×210 in line direction for 20 mm IGT disks).

The printing disk, fitted with its printer layer, was weighed before (m0) and after (m1) inking, on the IGT device provided for this purpose. Ink quantity X (g/m2) deposited on the sample is:

$$X=(m1-m0)/Sb \qquad (1)$$

The selected magenta ink was Skinnex reference 2X76 K+E. According to professionals, this ink is difficult to print with, because it is "drawing" in nature.

A paper strip is placed onto the rotating part of the IGT press (dimensions of paper sample: 25×290 mm). Two types of paper, with different capillarities, were selected—one non-coated, of matt finish, with a weight of 87 g/m2, and one coated, with a gloss finish, and a weight of 91 g/m2. The first type had a porous and absorbent surface (like a sponge), while the second was smoother and "closed". The papers, which were very sensitive to air humidity, were stored in the test room, and could not be touched with the fingers. In addition, the paper strips were always printed in the same direction and on the same surface (chosen arbitrarily), in order to get overcome the effects of paper fibre orientation.

The printing conditions were maintained constant in respect of pressure (250 N/cm) and speed (3.5 m/s), and estimated almost constant in respect of the temperature (22° C.) and the relative humidity (0%) in the room.

The disk was then weighed again (m2).

The thickness of the sample tested determined the circumference of the printing disk, and therefore the sample/paper contact area. The printer area can be different from the printed area, since the development of the rotating sector is constant. It is preferable that transferred ink quantity Y be determined from the difference between the weight of the paper after (m4) and before (m3) printing, and the printed area, Sp. The ink quantity Y (g/m2) transferred to the paper is:

$$Y=(m1-m2)/Sb \quad (2a)$$

$$Y=(m4-m3)/Sp \quad (2b)$$

It is necessary to do several transfer tests, incrementing the X ink quantity on the printing disk, from 1 to about 5 g/m2, and leaving it on the inking device for longer, or increasing the quantity of ink on the latter. The tests are used to draw a straight line, Y=f(X), the slope and length of which are determined by linear regression. This line is then used to determine the ink quantity X necessary on the blanket cylinder in order to obtain a cover Y of 1.0 and of 1.5 g/m2 on the paper. These values of Y are representative of the in cover in offset printing, and enable optical the densities required with this process to be achieved.

The results of the tests, namely the inking level X required to get the desired result, are given in the following table, for the two types of paper and the two levels of inking, Y, on the paper.

TABLE 2

| | Coated paper | | Non-coated paper | |
|---|---|---|---|---|
| | x(y = 1) g/m2 | x(y = 1.5) g/m2 | x(y = 1) g/m2 | x(y = 1.5) g/m2 |
| Polyurethane of the invention | 1.8 | 3.5 | 1.1 | 1.8 |
| Layer A | 2.6 | 4.2 | 1.6 | 2.4 |
| Layer B | 3.3 | 4.8 | 2.6 | 3.5 |

It can be seen that these tests were performed, as in the previous table, on polar polyurethane according to the invention, on the known lithographic layer A and on the other known layer B. In reality, the tests were carried out on blanket cylinders equipped with the above layers on their circumference, that is with polyurethane according to the invention, with layer A and layer B. These tests were conducted respectively on coated and non-coated paper onto which it was desired to transfer a quantity of ink corresponding to a cover of 1 and 1.5 grams per square meter, as previously explained.

It can be seen immediately from this table that the values for the lithographic layer containing polar polyurethane according to the invention, are less than all of the others, indicating that the lithographic layer according to the invention turns out to need less ink on the blanket cylinder in order to achieve the desired result on paper.

In other words, the consumption of ink by the blanket cylinder is considerably reduced, and the clogging of the lithographic layer is also reduced, since the blanket cylinder will require a relatively small proportion of the ink on the lithographic layer.

Moreover, the consumption of water, retaining all proportions, is lower, and deformation of the paper by water will also be reduced, given that due to the polar character of the water, it has a tendency to wet the surface or the lithographic layer of the blanket cylinder.

A lithographic layer according to the invention can be incorporated into an offset blanket cylinder designed to be mounted on an offset machine, or onto a sleeve which can be mounted in a removable manner on the offset machine.

What is more, it can be seen that because of the nature of the thermoplastic in the lithographic layer, the layer can be regenerated or restored by the action of heat, for example, that is by local application of heat to the damaged part of the blanket cylinder or the sleeve.

It can also be seen that since the lithographic layer according to the invention has a polar character, it follows that the dispersive component is not critical with regard to improving the transfer and the cleanliness of the layer, unlike blanket cylinders with a lithographic layer of the earlier type.

What we have produced therefore in this invention is a lithographic layer of a polar character which presents excellent qualities in terms of ink consumption, cleanliness, and transfer to paper, and one which can be incorporated into a blanket cylinder or a removable sleeve necessitating very infrequent replacement.

Of course the invention is not limited in any way to the methods of execution described, which have been given only by way of example.

In place of the polyurethance, one could therefore use an ethylene-propylene copolymer, or other thermoplastic elastomers, without moving outside the framework of the invention.

Consequently, this invention covers all techniques equivalent to those described, and combinations of these, if they are used in the spirit of the invention.

What is claimed is:

1. An outer printing layer of a blanket of a printing cylinder, consisting essentially of:

a thermoplastic polyurethane and an ethylene vinyl acetate copolymer, wherein the ethylene vinyl acetate copolymer is dispersed throughout the thermoplastic polyurethane.

2. The layer in accordance with claim 1, further comprising a mineral loading material, an organic loading material, or mixtures thereof.

3. The layer in accordance with claim 2, wherein the mineral loading material is selected from the group consisting of magnesium silicate, alumino-silicate, a metal oxide, and mixtures thereof.

4. The layer in accordance with claim 2, wherein the organic loading material is selected from the group consisting of a polyester, a chlorosulphonated polyethylene, polyetheramides, polyamide powder, and mixtures thereof.

5. The layer according to claim 2 wherein the organic loading material is a plastifier.

6. The layer according to claim 5 wherein the plastifier is selected from the group consisting of a polyester, a chlorosulphonated polyethylene, polyetheramides, and mixtures thereof.

7. The layer in accordance with claim 1, wherein for every 100 parts by weight of polyurethane the layer includes up to 20 parts by weight of the ethylene vinyl acetate copolymer, between 0 to 30 parts by weight of loading materials, and between 0 to 10 parts by weight of plastifier.

8. The layer in accordance with claim 7, wherein a surface of the layer comprises a component that is polar with respect to water, a component that is polar with respect to formamide, and a component that is polar with respect to dimethyl sulphoxide, each having a polarity in an amount of about 0 to 20 mJ/m2.

9. The layer in accordance with claim 8, wherein the component which is polar with respect to water has a polarity of about 5 to 15 $mJ/m^2$, and that the component which is polar with respect to formamide has a polarity of between 0 to 10 $mJ/m^2$.

10. The layer according to claim 8 wherein the component that is polar with respect to dimethyl sulphoxide has a polarity approximately the same as the component that is polar with respect to formamide.

11. The layer in accordance with claim 1, further comprising at least one pigment present in up to about 2 parts by weight for every 100 parts by weight of the thermoplastic material.

12. An outer printing layer of a blanket of a printing cylinder, consisting essentially of:

a thermoplastic ethylene-propylene copolymer, and an ethylene vinyl acetate copolymer, wherein the ethylene vinyl acetate copolymer is dispersed throughout the thermoplastic copolymer.

13. The layer in accordance with claim 12, further comprising a mineral loading material, an organic loading material, or mixtures thereof.

14. The layer in accordance with claim 13, wherein the mineral loading material is selected from the group consisting of magnesium silicate, alumino-silicate, a metal oxide, and mixtures thereof.

15. The layer in accordance with claim 13, wherein the organic loading material is selected from the group consisting of a polyester, a chlorosulphonated polyethylene, polyetheramides, polyamide powder, and mixtures thereof.

16. The layer according to claim 13, wherein the organic loading material is a plastifier.

17. The layer according to claim 16 wherein the plastifier is selected from the group consisting of a polyester, a chlorosulphonated polyethylene, polyetheramides, and mixtures thereof.

18. A method of transferring a printing ink onto a substrate comprising:

providing a blanket printing cylinder, said blanket printing cylinder comprising an outer printing layer consisting essentially of a thermoplastic polyurethane and an ethylene vinyl acetate copolymer, wherein the ethylene vinyl acetate copolymer is dispersed throughout the polyurethane;

inking the printing layer; and transferring the ink to a substrate.

19. The method according to claim 18 wherein the substrate is paper.

20. A method of transferring a printing ink onto a substrate comprising:

providing a blanket printing cylinder, said blanket printing cylinder comprising an outer printing layer consisting essentially of a thermoplastic ethylene-propylene copolymer, and an ethylene vinyl acetate copolymer, wherein the ethylene vinyl acetate copolymer is dispersed throughout the ethylene-propylene copolymer;

inking the printing layer; and transferring the ink to a substrate.

21. The method according to claim 20 wherein the substrate is paper.

* * * * *